United States Patent Office 2,983,649
Patented May 9, 1961

2,983,649

RICINOLEIC ACID ESTER SOLUTIONS OF ADRENO-CORTICAL HORMONES

Alberto Ercoli, Milan, Italy, assignor to Francesco Vismara Società per Azioni, Como, Italy, a corporation of Italy, and Alberto Ercoli, Milan Italy No Drawing. Filed Oct. 15, 1957, Ser. No. 690,201

6 Claims. (Cl. 167—77)

This invention is concerned with improvements in or relating to pharmaceutical compositions, more particularly with oily solutions for parenteral administration of adreno-cortical hormones.

The preparation of oily solutions of cortical hormones, such as cortisone and hydrocortisone, or of their corresponding $\Delta^1$ - dehydro - derivatives, 9-halogen and/or 6-methyl-derivatives, in sufficiently high concentrations required for many therapeutic purposes has been a problem.

It is well known, in fact, that these hormones, as well as their esters which may be used in therapy, are very sparingly soluble in the oily solvents which are commonly employed as vehicles for parenteral use e.g. olive oil, cottonseed oil, sesame oil, arachis oil or ethyl oleate. For this reason these hormones are usually administered parenterally in aqueous suspension or orally. Both these forms of administration have shown, however, a number of significant disadvantages.

Aqueous suspensions are not always well tolerated. The crystalline deposit is usually absorbed from the site of injection at too slow a rate. The poor absorption may cause phenomena of local intolerance. Aqueous suspensions may also give rise, especially in prolonged treatments, to irritations at the site of injection, which sometimes form abscesses.

Oral administration does not always assure regularity as well as constancy of action, and does not guarantee a complete uptake of the drug. Furthermore prolonged administration of anti-reactional hormones by oral route frequently causes gastritis which may complicate into ulcers of a particularly dangerous type.

An object of the present invention is to provide compositions of adreno-cortical hormones in the form of oily solutions, in order to reduce the disadvantages of the two above-mentioned forms of administration.

Another object of the invention is to provide oily solutions with a high hormonal concentration which are of considerable importance in the treatment of certain diseases where high doses of the hormone are required.

Further objects will become apparent as the description proceeds.

It has now been found that very satisfactory parenterally acceptable solutions of adreno-cortical hormones may be prepared by using esters of ricinoleic acid with certain mono and polyhydric alcohols as solvents; such solutions may, of course, contain other adjuvants which are not esters, but which are parenterally acceptable and pharmaceutically compatible therewith such as antioxidants, etc.

According to the invention there is provided an oily composition adapted for parenteral administration comprising one or more adreno-cortical hormones in solution in a liquid vehicle consisting of one or more parenterally-acceptable esters of ricinoleic acid with a monohydric or polyhydric alcohol containing two or three carbon atoms per molecule. The composition may contain, if desired, other parenterally-acceptable compatible adjuvants which are not esters.

By the term "adreno-cortical hormone" is to be understood steroid compounds having adreno-cortical activity. Such compounds include not only those present in nature but also related compounds which are believed not to be present in nature but which have similar activity to a greater or lesser degree. Thus in addition to including naturally-occurring compounds such as cortisone and hydrocortisone it includes derivatives thereof such as prednisone and prednisolone. Moreover, the term also includes 21-esters of any naturally occurring or synthetic adreno-cortical hormones.

Esters of ricinoleic acid with glycerol, propylene glycol or ethyl alcohol are preferred because of their high solubilizing power and of their good local tolerance.

The oily solutions according to the invention are well-tolerated, well-absorbed at the site of injection and accompanied by relatively few side-effects, even in cases where high doses are administered. They possess a high therapeutic value which makes them active at small doses not otherwise effective, as, for instance, in the liver glycogen deposition test where, at equal doses, prednisone in an oily solution has been shown to have an activity five times higher than that of the oral form (that is in order to obtain the same increase in liver glycogen, an oral dose five times higher than that administered parenterally in oily form must be given).

Although the adreno-cortical hormone used in the oily composition according to the invention may be any desired such compound it is preferred to use a compound of the general formula:

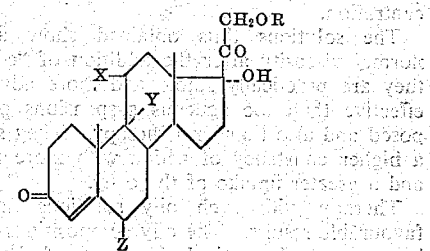

where

X is ketonic oxygen or a hydroxyl group,
Y is a hydrogen or a halogen atom,
Z is a hydrogen atom or a methyl group, and
R is hydrogen or an acyl group preferably containing not more than 11 carbon atoms per molecule or a $\Delta^1$ or a $\Delta^{1,6}$-dehydro-derivative thereof.

If desired, one may use mixtures of adreno-cortical hormones.

The vehicles used in the composition according to the invention can be used either individually or in admixture with other such vehicles in various proportions. These vehicles can also be diluted if desired with a further ester component consisting of a parenterally-acceptable ester of an alcohol with a carboxylic acid other than ricinoleic acid, said ester containing at least six carbon atoms per molecule, such as olive oil, sesame oil, ethyl oleate, or benzyl benzoate.

The mixtures, for example with ethyl oleate, have a solubilising power inferior to that of pure ricinoleates; on the other hand, they have the advantage of a lower viscosity, so that injection becomes easier.

Tables 1 and 2 show the solubilities of cortisone, prednisone and prednisolone and of some of their esters in the ricinoleic acid esters, as compared with their respective solubilities in olive oil or sesame oil.

TABLE 1

| | Cortisone acetate, mg./cc. | Cortisone trimethyl-acetate, mg./cc. | Cortisone oenanthate, mg./cc. | Cortisone cyclopentyl-propionate, mg./cc. | Cortisone phenyl-propionate, mg./cc. |
|---|---|---|---|---|---|
| Olive oil | 0.1 | 0.1 | 8 | 3 | 3 |
| Glyceryl ricinoleate | 5 | 3 | 60 | 40 | 30 |
| Ethyl ricinoleate | 3 | | 60 | 40 | 26 |
| Glyceryl ricinoleate+Ethyl ricinoleate | | 2.5(b) | | 40(a) | |
| Glyceryl ricinoleate+Ethyl oleate 1:1 | 4 | 2.5 | 50 | 30 | 25 |

(a) = Glyceryl ricinoleate:ethyl ricinoleate=1:1.
(b) = Glyceryl ricinoleate:ethyl ricinoleate=1:2.

TABLE 2

| | Prednisone, mg./cc. | Prednisone acetate, mg./cc. | Prednisone trimethyl-acetate, mg./cc. | Prednisone oenanthate, mg./cc. | Prednisone cyclopentyl-propionate, mg./cc. | Prednisolone, mg./cc. | Prednisolone oenanthate, mg./cc. |
|---|---|---|---|---|---|---|---|
| Sesame oil | 2 | 2 | 1 | 3 | 2 | 1 | 6 |
| Glyceryl ricinoleate | 12 | 10 | 8 | 12 | 10 | 25 | 60 |
| Ethyl ricinoleate | 10 | | 7 | | | 20 | 40 |
| Glyceryl ricinoleate+Ethyl ricinoleate | 8 | 9 | 4 | 10 | 10 | | 32 |
| Glyceryl ricinoleate+Ethyl oleate 1:1 | | 7 | 3.8 | 9 | 8 | 16 | |

The adreno-cortical hormones can be dissolved in the ricinoleic acid esters alone or in admixture with other such esters and in various proportions as stated above. Moreover different esters of the same hormone or various esters of different hormones can be dissolved simultaneously in the same vehicle or in a mixture of different vehicles. By a suitable mixture of a number of esters of the same hormone or of different hormones, oily compositions can be obtained with a high hormonal concentration.

The solutions thus obtained show a substantially normal viscosity after the addition of "correctives" and they are practically stable and more advantageous and effective than the agueous suspensions previously proposed and also than oral therapy. They ensure, in fact, a higher constancy of action with more marked effects and a greater uptake of the drug.

Therapy with such oily solutions has given very favourable results. The oily compositions of the cortical hormones and, particularly, those of the antireactional hormones, have ben found to possess a generally superior therapeutic value to that obtained by aqueous suspensions or by the oral route.

In most conditions of acute and chronic articular rheumatism, infectious diseases, allergic syndromes, etc., injectable preparations have been found to give optimal clinical remissions with doses lower than those normally required by the oral route; for example: 15 mgms. of prednisone in oily solution have given results comparable with those obtainable with 20–25 mgms. of the same hormone administered by the oral route. This constitutes an appreciable advantage, even from the economic point of view.

Although the liquid vehicle used in the compositions according to the invention has been defined in somewhat narrow terms, it should be understood that one may, if desired, add to the composition other pharmacological substances in addition to the adreno-cortical hormones. Substances of this nature include, for example sex hormones and products related to steroid hormones.

Moreover, one may add to the composition desired pharmaceutically acceptable adjuvants such as antioxidants and conserving or antiseptic agents (such as mono- or polyhydric phenols and ethers thereof) to prolong the stability of the components of the composition.

In order that the invention may be well understood, the following examples are given by way of illustration only.

Example 1

Cortisone trimethylacetate (5 g.) was ground to a fine powder and suspended in a two litre mixture of glyceryl and ethyl ricinoleates. 5 mg./litre of propyl gallate and nordihydroguaiaretic acid (in equal parts) were added. The mixture was heated on a water-bath with occasional shaking of the suspension so as to obtain a clear and homogeneous solution. The resultant solution was then transferred into neutral glass 2 cc. ampoules, each ampoule thus containing 5 mg. of cortisone trimethylacetate. The ampoules, sealed under nitrogen, were sterilised at a temperature of 120° C., for 30 minutes. A number of the ampoules were used for biological experiments. The remainder were maintained for some weeks in the ice-chest and then for some months at room temperature. The ampoules thus treated remained perfectly clear and homogeneous, even after many months had elapsed from the date of their preparation. The addition of small crystals of cortisone trimethylacetate failed to cause either opalescence or the formation of a crystalline precipitate.

The comparison of the biological activity of the oily solution of cortisone trimethylacetate was carried out with an aqueous suspension of cortisone acetate at the same concentration (mg./cc.), using the test of the survival of adrenalectomised rats treated with one single injection of the steroid. The test was carried out on male rats, 30 days old and weighing 60 g. each. Bilateral adrenalectomy was carried out under ether narcosis, according to the Grollman's technique. 3–4 hours after the adrenalectomy, the animals were subdivided into two groups of ten animals each. All the animals of one group were treated with one single injection of 2.5 mg. of cortisone acetate in aqueous suspension. All the animals of the other group were treated with one single injection of 2.5 mg. of cortisone trimethylacetate in oily solution.

A third group of ten adrenalectomised animals served as controls. The results obtained are shown in the following table.

TABLE 3

| Days after intervention | Number of living animals | | |
|---|---|---|---|
| | Untreated | Treated with 2.5 mg. of cortisone acetate in aqueous suspension | Treated with 2.5 mg. of cortisone trimethyl-acetate in oily solution |
| 5 | 2 | 10 | 10 |
| 6 | 0 | 8 | 10 |
| 7 | | 8 | 10 |
| 8 | | 8 | 10 |
| 9 | | 4 | 10 |
| 10 | | 4 | 10 |
| 11 | | 4 | 10 |
| 12 | | 2 | 7 |
| 13 | | 0 | 7 |
| 14 | | | 6 |
| 15 | | | 3 |
| 16 | | | 2 |

*Example 2*

Cortisone oenanthate (500 g., M.P. 138–140° C.), cortisone cyclopentyl-propionate (300 g., M.P. 154–156° C.) and cortisone phenyl-propionate (200 g., M.P. 173–175° C.) were suspended in a 20 litre mixture of glyceryl triricinoleate and ethyl oleate (1:1), containing nordihydroguaiaretic acid in the proportion of 10 mg./litre. The mixture was stirred mechanically, the internal temperature being kept at 100° C. so as to obtain a clear and homogeneous solution. This solution was then introduced into 2 cc. ampoules, so that each one contained exactly 100 mg. of the mixture of the cortisone esters (50 mg./cc.). The ampoules, sealed under nitrogen, were sterilised at a temperature of 120° C. for about 30 minutes. When the exception of some of these ampoules, which were used for biological experiments, the remainder were maintained for a few weeks, at about 0° C. in an ice-chest, then for some months at room temperature. None of the ampoules thus treated showed any turbidity or precipitate even a few months after the date of their preparation.

*Example 3*

A mixture of cortisone trimethylacetate (100 g., M.P. 260–262° C.), dehydrocorticosterone trimethylacetate (100 g., M.P. 186–187° C.) and desoxycorticosterone trimethylacetate (100 g., M.P. 200–202° C.) was dissolved at a temperature of about 80° C., in a 40 litre solution of ethyl ricinoleate diluted with 10% of ethyl oleate and containing, in the proportion of 8 mg./litre, nordihydroguaiaretic acid and propyl gallate in equal parts.

The clear solution was then introduced into 4000 containers of 10 cc. capacity so that each contained 75 mg. of the active substances (7.5 mg./cc.). This oily solution is very efficient in the treatment of adrenocortical deficiencies.

*Example 4*

Prednisone oenanthate (30 g., M.P. 176–178° C.) was admixed with 2.5 litres of a propylenyl ricinoleate solution containing propyl gallate in the proportion of 8 mg./litre in a 5-litre neutral glass flask. The flask was heated on a water-bath, the suspension being occasionally shaken and the temperature slowly raised until dissolution was complete. The clear and homogeneous solution thus obtained was introduced into 2 cc. ampoules so that each ampoule contained exactly 24 mg. of prednisone oenanthate. The ampoules were closed in a nitrogen atmosphere, sterilised and then maintained for some weeks in the ice-chest. The solution inside the ampoules remained quite clear and homogeneous and was practically uncongealable.

In the same way, prednisone cyclopentyl-propionate (75 g., M.P. 188–190° C.) were dissolved in 7.5 litres of a mixed solution of glyceryl and ethyl ricinoleates, to which had been added, in the proportion of 5 mg./litre, nordihydroguaiaretic acid. The solution thus obtained was introduced into 10 cc. containers. (Each container thus contained 100 mg. of prednisone cyclopentylpropionate.) A few months after the date of preparation the solution inside the containers was still perfectly homogeneous. There was no formation of any precipitate, even after the addition of seed crystals of prednisone cyclopentylpropionate.

In the same manner as above prednisone was dissolved in a mixture of glyceryl and ethyl ricinoleates (1:1). The biological activity of the prednisone, administered parenterally, in oily solution, was compared with that of prednisone administered orally. The comparison was carried out on albino rats and the action on thymus, adrenals and body weight was obtained.

The liposoluble prednisone was administered in doses of 50–100–200–400γ and the orally administered prednisone in doses of 100–200–400–600–1000γ. This treatment was continued for five consecutive days; on the 6th day the animals were sacrificed; the adrenals and thymus were removed and weighed immediately. The results are shown in the table below.

TABLE 4

| Treatment | Animals, No. | Body weight change, Percent | Adrenals weight, Percent | Thymus weight, Percent |
|---|---|---|---|---|
| Controls | 31 | 107.7±1.26 | 13.1±0.36 | 89.4±4.79 |
| Prednisone i.m.: | | | | |
| 400 x 5 | 12 | 85.2±1.29 | 7.7±0.21 | 16.1±0.26 |
| 200 x 5 | 23 | 90.2±2.92 | 8.9±0.37 | 22.3±1.17 |
| 100 x 5 | 12 | 103.8±3.10 | 11.6±0.60 | 36.9±5.19 |
| 50 x 5 | 6 | 102.6±2.92 | 13.1±0.54 | 57.7±6.08 |
| Prednisone per os: | | | | |
| 1,000 x 5 | 6 | 106.1±2.23 | 11.0±0.81 | 23.1±1.95 |
| 600 x 5 | 6 | 105.6±2.50 | 13.0±0.44 | 41.0±2.59 |
| 400 x 5 | 12 | 108.4±2.69 | 12.4±0.56 | 43.2±4.12 |
| 200 x 5 | 19 | 109.3±1.44 | 12.8±0.88 | 51.5±3.74 |
| 100 x 5 | 6 | 104.8±2.23 | 13.6±0.89 | 50.0±6.16 |

These results show that, with regard to the activity on thymus, adrenals and body weight, the prednisone preparation in oily solution administered intramuscularly is much more active than the orally administered prednisone.

*Example 5*

Hydrocortisone acetate (15 g., M.P. 219–220°) was dissolved by heating in 1.5 litres of propylenyl ricinoleate, prepared by esterification of ricinoleic acid with propylene glycol. The solution (containing 20 mg. of hydrocortisone acetate per cc.) was introduced into 2 cc. ampoules which were then sealed under vacuum and sterilized in an autoclave.

The ampoule solution was biologically tested—after diluting 1:10 with sesame oil—for its effects on the survival of adrenalectomised rats and its was found to be very effective.

*Example 6*

Prednisolone (100 g., M.P. 240–242° C.) was dissolved by heating in a mixture of ethyl ricinoleate and ethyl oleate (1:1) to give a concentration of 15 mg./cc. Multidose containers (10 cc.) were filled with this solution in the usual manner, sealed and sterilised.

*Example 7*

In the same manner as in Examples 1–6, oily solutions for use in parenteral administration were prepared with other steroids using glyceryl, propylenyl and ethyl ricinoleates singly and in admixture as the liquid vehicle.

Among the steroids made up into such preparations were 9α-fluoro derivatives of prednisone and prednisolone and their corresponding Δ⁶-dehydro or 6-methyl derivatives, i.e.: 9α-fluoro $\Delta^{1,4}$-pregnadiene-11β:17α:21-triol- 3:30-dione; Δ¹,⁴,⁶-pregnatriene-11β:17α:21-triol-3:20-dione; 9α-fluoro Δ¹,⁴,⁶-pregnatriene 11β:17α:21-triol-3:20-dione; 9α-fluoro-6-methyl-Δ¹,⁴-pregnadiene-11β:17α:21-triol-3:20-dione.

Example 8

Prednisone trimethylacetate (8 g.) was ground to a fine powder and suspended in a two litre mixture of glyceryl and ethyl ricinoleates, 5 mg./litre of propyl gallate and nordihydroguaiaretic acid (in equal parts) were then added. The mixture was heated on a water-bath, the suspension being occasionally shaken and the temperature slowly raised until a clear and homogeneous solution was obtained. This solution was then transferred into neutral glass 2 cc. ampoules, each ampoule thus having 8 mg. of prednisone trimethylacetate. The ampoules, sealed under nitrogen and sterilised, were maintained for some weeks in an ice-chest and then for some months at room temperature. The ampoules thus treated remained perfectly clear and homogeneous, even after many months had elapsed from the date of their preparation. Even the addition of small crystals of prednisone trimethylacetate caused neither opalescence nor crytalline precipitation.

The biological activity of prednisone trimethylacetate in the above vehicle was compared to that of the prednisone orally administered. On the turpentine granuloma test prednisone trimethylacetate in oily solution showed an anti-inflammatory power clearly superior to that of the prednisone, administerd by oral route.

Example 9

Prednisone trimethylacetate (35 g., M.P. 274–278° C.), prednisone oenanthate (80 g. M.P. 176–178° C.) and prednisone cyclopentyl-propionate (75 g., M.P. 188–190° C.) were suspended in a 10 litre mixture of glyceryl tri-ricinoleate and ethyl oleate (1:1), containing nordihydroguaiaretic acid in the proportion of 10 mg./litre. The mixture was stirred mechanically, the internal temperature being kept at 100° C. so as to obtain a clear and homogeneous solution. This solution was then introduced into 2 cc. ampoules, so that each contained exactly 38 mg. of the mixture of the prednisone esters (19 mg./cc.). The ampoules, sealed under nitrogen, were sterilised at a temperature of 120° C. for about 30 minutes. After a few weeks at about 0° C. they were maintained for some months at room temperature. None of the ampoules thus-treated showed any turbidity or precipitate even a few months after the date of their preparation.

The oily solution of the prednisone esters were biologically tested—after a dilution 1:10 with sesame oil—for its effects on the survival of the adrenalectomised rats and it was found to be very effective.

Example 10

A mixture of prednisone trimethylacetate (15 g.), predisolone trimethylacetate (55 g.) and 9α-fluoro-prednisolone trimethylacetate (30 g.) was dissolved, at a temperature of about 80° C., in a 5 litre solution of ethyl ricinoleate containing 10% of ethyl oleate and nordihydroguaiaretic acid and propyl gallate, in equal parts, in the proportion of 8 mg./litre.

The clear solution was then introduced into 500 containers of 10 cc. each, so that each contained 200 mg. of the trimethyl-acetate mixture.

In the same manner, prednisone oenanthate (20 g.) and prednisolone oenanthate (80 g.) were dissolved in a 2 litre solution of glyceryl ricinoleate (50 mg./cc.).

Example 11

Prednisone (4 g.) and prednisolone (8 g.) were dissolved by heating in 500 cc. of propylenyl ricinoleate, prepared by the esterification of ricinoleic acid with propylene glycol.

It will be obvious to those skilled in the art that adreno-cortical hormones other than those specifically disclosed may be used in the compositions according to the invention and that various other modifications may be made to these compositions without departing from the spirit of the invention.

I claim:

1. An oily composition adapted for parenteral administration comprising at least one adreno-cortical hormone selected from the group consisting of adreno-cortical hormones of the general formula:

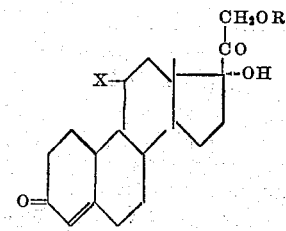

where X is selected from the group consisting of an oxygen atom and a hydroxyl group; R is selected from the group consisting of a hydrogen atom acyl group derived from a monocarboxylic acid containing not more than 11 carbon atoms per molecule, the corresponding Δ¹,⁴ and Δ¹,⁴,⁶ compounds in solution in a liquid vehicle consisting of at least one ester of ricinoleic acid with an alcohol selected from the group consisting of mono- and polyhydric alcohols containing at least 2 and not more than 3 carbon atoms per molecule.

2. An oily composition as defined in claim 1 also containing an anti-oxidant.

3. An oily composition as defined in claim 1, in which said adreno-cortical hormone is present in an amount of 0.1–0.4% by weight of said liquid vehicle.

4. An oily composition as defined in claim 1 in which said ester is an ester of ricinoleic acid with an alcohol selected from the group consisting of ethyl alcohol, propylene glycol and glycerol.

5. An oily composition as defined in claim 1 also containing a further ester component consisting of an ester of an alcohol with a carboxylic acid other than ricinoleic acid, said ester containing at least six carbon atoms per molecule.

6. An oily composition as defined in claim 5 in which said ester is selected from the group consisting of olive oil, sesame oil, ethyl oleate and benzyl benzoate.

References Cited in the file of this patent

UNITED STATES PATENTS

| | | |
|---|---|---|
| 2,661,315 | Jurist et al. | Dec. 1, 1953 |
| 2,675,342 | Lee et al. | Apr. 13, 1954 |
| 2,768,112 | Buckwalter | Oct. 23, 1956 |
| 2,822,316 | Richter | Feb. 4, 1958 |

OTHER REFERENCES

U.S. Dispensatory, 25th ed., 1955, p. 263.

Minozzi: Gazzetta Medica Italiana, Minerva Medica Ed., 115: 11, November 1956, pp. 1–28, esp. p. 7 footnote.